United States Patent Office 3,427,259
Patented Feb. 11, 1969

3,427,259
POLYMERIZING OF OXIRANE MONOEPOXIDES IN THE PRESENCE OF A REACTION PRODUCT OF AN ORGANOMETALLIC COMPOUND AND A POLYOXYALKYLENE GLYCOL
Kenneth T. Garty, Somerville, and Thomas B. Gibb, Jr., Murray Hill, N.J., assignors to Union Carbide Corporation, a corporation of New York
No Drawing. Continuation-in-part of application Ser. No. 824,191, July 1, 1959. This application Oct. 16, 1963, Ser. No. 316,522
U.S. Cl. 260—2
Int. Cl. C08g 30/02; C07f 3/00
21 Claims The invention relates to a catalyst which is the reaction product of an organometallic compound having the formula $R_1$—Me—$R_2$ wherein $R_1$ and $R_2$ are hydrocarbon radicals and Me is a metal of Group II and ethylene glycol or a polyoxyalkylene glycol and the use of this catalyst to polymerize oxirane monoepoxides.

This application is a continuation-in-part of our copending application Ser. No. 824,191, filed July 1, 1959, now U.S. Patent 3,275,598.

This invention relates to the polymerization of oxirane monoepoxide monomers. More particularly, this invention relates to an improved method of polymerizing oxirane monoepoxide monomers whereby relatively high conversions of monomer to polymer are effected in relatively short periods of time.

Polymerization of oxirane monoepoxides in the presence of an organometallic compound, such as dibutyl zinc, which serves as a catalyst for the polymerization reaction, has been found to be desirable as the polymers produced are hard solids which are useful in the manufacture of various shaped articles and in the preparation of film material which can be used in the manufacture of bags, wrapping material and the like. Moreover, the organometallic compound remaining in the polymer at the termination of the polymerization reaction can be converted into an inert, nondeleterious residue, which can be left in the polymer if so desired, by a simple operation wherein the polymer is contacted with water or ethyl alcohol (aqueous). Consequently, solid polymers produced by polymerizing an oxirane monoepoxide in the presence of an organometallic compound do not require any elaborate and time consuming purification operations in order to remove catalyst residue therefrom.

The extensive use of organometallic compounds as catalysts for the polymerization of oxirane monoepoxides to produce solid polymers has been seriously limited, however, due to the relatively long periods of time required in order to obtain any significant polymer yields. In addition, it has not been possible to obtain reproducible yields of solid polymer using organometallic compounds as catalysts. Yields obtained have varied from batch to batch and have been relatively small.

The present invention provides for the production of polymers by polymerizing a monomeric oxirane monoepoxide utilizing an organometallic compound and a controlled amount of a glycol, as will be subsequently defined, whereby relatively high conversions of monomer to polymer are effected in a relatively short period of time. Moreover, the use of a glycol allows for reproducibility of polymer yields.

The amount of glycol employed, in accordance with this invention, can vary from about 0.3 mole to about 4 moles, per mole of the organometallic compound. Optimum results are achieved using about 0.5 mole to about 3 moles of glycol, per mole of organometallic compound.

Compounds suitable for purposes of this invention are ethylene glycol and glycols, or more specifically polyoxyalkylene glycols, having the formula:

$$HO(C_nH_{2n}O)_xH$$

wherein $n$ is an integer having a value of 2 to 50, inclusive, preferably 2 to 5 inclusive and $x$ is an integer having a value of 2 to 25 inclusive and preferably 2 to 5, inclusive. Suitable glycols falling within the scope of the formula above are poly(ethylene glycol), poly(diethylene glycol), poly(1,2-propylene glycol), poly(1,3-propylene glycol), poly(1,4-butylene glycol) and the like.

The term "polymer" as used herein is intended to encompass homopolymers, as well as copolymers and interpolymers produced by polymerizing a mixture containing two or more monomeric oxirane monoepoxides.

Organometallics which can be employed as catalysts for the polymerization of oxirane monoepoxides to produce solid polymers are compounds whose compositions can be represented by the formula:

$$R_1—Me—R_2$$

wherein Me is a metal of Group II of the Periodic Table, i.e., beryllium, magnesium, calcium, zinc, strontium, cadmium, barium, mercury, and radium; and wherein $R_1$ and $R_2$ are hydrocarbon radicals such as alkyl, aryl, aralkyl, alkaryl, cycloalkyl and the like. Particularly desirable organometallics are those compounds having the structural formula noted above wherein $R_1$ and $R_2$ are hydrocarbon radicals having from 1 to 10 carbon atoms and being free from olefinic and acetylenic unsaturation.

Representative $R_1$ and $R_2$ radicals include, among others, methyl, ethyl, propyl, isopropyl, n-butyl, isobutyl, allyl, 2-ethylhexyl, dodecyl, octadecyl, phenyl, tolyl, xylyl, benzyl, phenethyl, phenylpropyl, phenylbutyl, cyclopentyl, cyclohexyl, cycloheptyl, 3-propylcyclohexyl, and the like.

Illustrative of organometallic compounds which can be used as catalysts can be noted diethyl zinc, dipropyl zinc, di-n-butyl zinc, dioctadecyl zinc, dicyclohexyl zinc, diphenyl zinc, di-o-tolyl zinc, diethyl magnesium, di-n-butyl magnesium, dioctyl magnesium, diphenyl magnesium, diethyl beryllium, di-n-butyl beryllium, diethyl cadmium, dipropyl cadmium, diisoamyl cadmium, diphenyl cadmium, and the like. The organometallics are known compounds and can be prepared according to the methods described in Berichte 63, (1934), 931 (1926).

The organometallic compounds are generally used in catalytic amounts, that is, in amounts sufficient to catalyze the polymerization of oxirane monepoxides to solid polymers. The actual quantity of organometallic compound used can be varied between wide limits, for example, from about 0.01 to about 12 percent by weight and higher, based on the weight of the monomer charged. It is preferred to use an amount of catalyst ranging from about 0.1 to about 3 percent by weight.

The term "oxirane monoepoxide" as used herein is intended to encompass, among others, those compounds having a single terminal epoxy group, i.e.:

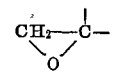

which are free of interfering groups, that is, an ester group, an acid group, an amino group, and an aldehyde group.

Among such oxirane monoepoxides can be mentioned the epihalohydrins, such as 1,2-epoxy-3-chloropropane, 1,2-epoxy-3-bromopropane and the like; the olefin oxides, such as 1,2-epoxyethane, 1,2-epoxypropane; 1,2-epoxybutane, 1,2-epoxypentane, 1,2-epoxyhexane, 1,2-epoxyheptane, 1,2-epoxybutene, cyclohexene oxide, 1,2-epoxyphenylethane, 1,2-epoxy-p-methylphenylethane, 1,2-epoxyo-chlorophenylethane and the like; epoxy alkyl ethers, such as those having the structural formula:

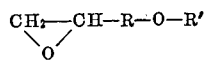

wherein R' is a hydrocarbon radical such as alkyl, aryl, alkaryl, aralkyl, allyl and the like, and wherein R is a saturated aliphatic hydrocarbon radical. Particularly desirable polymers are those produced by polymerizing a monomer having the structural formula noted above wherein R contains from 1 to 4 carbon atoms and R' is a phenyl or alkyl substituted phenyl radical wherein the alkyl substituent contains up to 12 carbon atoms. Illustrative radicals for R include, among others, methylene, ethylene, trimethylene, tetramethylene, hexamethylene, octamethylene and the like. Representative radicals for R' include, among others, phenyl, 2-, 3-, and 4-methylphenyl, 4-isopropylphenyl, 4-tertiary-butylphenyl, 4-octylphenyl, ethyl, propyl, butyl, allyl and the like.

Suitable epoxyalkyl ethers include the following:
1,2-epoxy-3-phenoxy propane,
1,2-epoxy-4-phenoxybutane,
1,2-epoxy-5-phenoxypentane,
1,2-epoxy-6-phenoxyhexane,
1,2-epoxy-3-(o-methylphenoxy)propane,
1,2-epoxy-3-(m-methylphenoxy)propane,
1,2-epoxy-3-(p-methylphenoxy)propane,
1,2-epoxy-3-(o-isopropylphenoxy)propane,
1,2-epoxy-3-(p-tertiary butylphenoxy)propane,
1,2-epoxy-3-(p-octylphenoxy)propane,
1,2-epoxy-3-(o-chlorophenoxy)propane,
1,2-epoxy-3-(2,4-dimethylphenoxy)propane,
1,2-epoxy-3-(2,3-dimethylphenoxy)propane,
1,2-epoxy-3-(2,6-dimethylphenoxy)propane,
1,2-epoxy-3-(2-chloro-4-methylphenoxy)propane,
1,2-epoxy-3-(o-amylphenoxy)propane,
1,2-epoxy-4-(o-methylphenoxy)butane,
1,2-epoxy-4-(2,4-dimethylphenoxy)butane,
1,2-epoxy-4-(2,5-dimethylphenoxy)butane,
1,2-epoxy-4-(2,4-dichlorophenoxy)butane,
1,2-epoxy-4-(2,5-dichlorophenoxy)butane,
1,2-epoxy-6-(2,3-dibromophenoxy)hexane,
allyl glycidyl ether and the like.

The polymerization reaction is conducted by charging an oxirane monoepoxide monomer or mixture of monomers, an organometallic compound and a controlled amount of a glycol, as described, into a reaction vessel and generally subjecting the reaction vessel to heat. Actually, the temperature at which the polymerization reaction is conducted can be varied over a wide temperature range, from about 0° C. to about 200° C., and, if desired, even higher. A temperature in the range of about 60° C. to about 175° C. is most preferred. Alternatively, the organometallic catalyst can be admixed with the glycol and the monomer added thereto.

On contacting a glycol, as described, with an organometallic, a reaction takes place between the two which results in the formation of a reaction product, the exact nature of which is not known. In order to conclusively show that the organometallic reacts with the glycol, two reaction mixtures were prepared. Reaction mixture A contained toluene (a diluent), ethylene glycol, and dibutyl zinc in a molar ratio of 0.5 mole of glycol to 1 mole of dibutyl zinc. Reaction mixture B contained toluene (a diluent), poly(ethylene glycol) having an everage molecular weight of about 150, and dibutyl zinc in a molar ratio of 0.5 mole of glycol to 1 mole of dibutyl zinc. Each liquid mixture was allowed to stand under an argon gas atmosphere for 24 hours at a temperature of about 23° C. Samples were withdrawn from the vapor space above each liquid mixture and analyzed by vapor-phase chromatography. Infrared spectra were also obtained on each liquid reaction mixture. Vapor-phase chromatography analysis indicated, with respect to both reaction systems, that butane was the major product. Infrared spectra of the liquid phase of both reaction systems indicated the absence of hydroxyl groups. Concentration of each system resulted in obtaining a solid reaction product.

It is also preferred to conduct the polymerization reaction in the presence of an organic diluent which is non-reactive with respect to the monomer, catalyst, and polymer and is a solvent for the monomer and catalyst mixture. During the polymerization reaction, particularly whenever about 50 percent or more of the monomer is converted to the polymer, the reaction mixture becomes highly viscous. If a diluent is not present, it is difficult to remove the heat of reaction which, if not removed, might cause undesirable side reactions to occur. In addition, the use of a diluent facilitates removal of unreacted monomer from the polymer.

Illustrative of suitable organic diluents can be noted the aromatic hydrocarbons, such as benzene, chlorobenzene, toluene, xylene and the like; cycloaliphatics, such as cyclopentane, cyclohexane, isopropyl cyclohexane and the like; alkoxy compounds, such as methoxybenzene and the like; the dimethyl and diethyl ethers of ethylene glycol, propylene glycol, diethylene glycol; aliphatics, i.e., hexane and the like.

The diluent can be added prior to the commencement of the polymerization reaction or during the polymerization reaction in amounts of from about 5 to about 90 parts by weight per 100 parts by weight monomer and diluent.

The polymerization reaction is preferably conducted under an inert atmosphere, e.g., nitrogen and under atmospheric, subatmospheric, or superatmospheric pressure.

The crude product resulting from the polymerization reaction usually contains, in addition to the solid polymer, some unreacted monomer, and also catalyst residue. Removal of the unreacted monomer and catalyst residue can be accomplished in any convenient manner. If desired, the catalyst residue can be left in the polymer after first treating the polymer with water or aqueous ethyl alcohol. For instance, when dibutyl zinc is the catalyst used and it is desired to allow the catalyst residue to remain in the polymer, the polymer is conveniently treated with aqueous ethyl alcohol whereby the catalyst is converted to its oxide, which oxide is inert and does not have any deleterious effect on the polymer. The ethyl alcohol is driven from the polymer by applying heat thereto. When it is desired to remove both unreacted monomer and catalyst residue from the polymer produced, as for example, poly(1,2-epoxy-3-phenoxypropane), the crude product is dispersed in a mixture of acetone and hydrochloric acid, the dispersion is then filtered, thereby obtaining the polymer as a filter cake and, if necessary, then washing the polymer with small amounts of ethyl alcohol to obtain a white colored solid. Unreacted monomer and catalyst residue can be removed from a polymer such as poly(1,2-epoxyethane) by dissolving the crude product in aqueous ethyl alcohol, filtering off the catalyst residue, concentrating the solution to remove the alcohol and recovering the polymer. In general, it is desirable to remove the unreacted monomer from the crude product as the polymer recovered exhibits enhanced thermal and dimensional stability.

The percent conversion of monomer to polymer, as noted herein, was determined by recovering the polymer, drying the polymer to constant weight at a temperature of from about 50° C. to 60° C. under a pressure of 25 mm. Hg, weighing the polymer, dividing the weight of the polymer by the weight of the monomer charged, and multiplying by 100.

In the following examples, which are illustrative of the present invention and not intended to limit the scope thereof in any manner, the reduced viscosity measurements, which are a measure of the molecular weight, were made as follows:

A 0.05 gram sample of polymer was weighed into a 25 ml. volumetric flask and p-chlorophenol containing 2 percent by weight pinene added thereto. The flask was heated for 30 minutes in an oil bath maintained at 140° C. with intermittent swirling. After solution was complete, additional p-chlorophenol containing 2 percent by weight pinene was added to produce a 25 ml. solution while maintaining the flask in a 47° C. constant temperature bath. The solution was thereafter filtered through a sintered glass funnel and the viscosity of a 3 ml. sample determined in a Cannon viscometer at about 47° C.

Reduced viscosity was computed by use of the equation:

$$RV = \frac{t_s - t_0}{ct_0}$$

where:

$t_0$ is the efflux time for the solvent
$t_s$ is the efflux time for the polymer solution
$c$ is the concentration of the solution in terms of grams of polymer per 100 ml. of solution

EXAMPLE 1

To each of a series of glass tubes which had been flushed out with nitrogen gas there was charged 10 grams of 1,2-epoxy-3-phenoxypropane, 0.15 gram of dibutyl zinc, 13 ml. of toluene, and various amounts of ethylene glycol.

Each tube was provided with a nitrogen gas atmosphere, sealed, and heated at 90° C. for 10 hours in an air circulating oven. Each tube was broken open and the contents thereof transferred to a Waring Blendor using 200 ml. of a mixture (50–50 on a volume basis) of acetone and toluene acidified with 5 ml. of 1 N hydrochloric acid. After thorough agitation of the Waring Blendor, the mixture was poured into ethyl alcohol. The amount of ethyl alcohol was 100 times the volume of the mixture. The polymer precipitated out of the ethyl alcohol and was recovered as a filter cake. The polymer was then washed with small quantities of ethyl alcohol, dried at 60° C. for 24 hours under a pressure of 25 mm. Hg and then dried an additional 24 hours at a temperature of from 40° C. to 60° C. and under a pressure of 25 mm. Hg.

The percent conversion of monomer to polymer, the mole ratio of ethylene glycol to dibutyl zinc, and the reduced viscosity of the polymer obtained are noted in the table below.

| | Control 1 | 1 | 2 | 3 | 4 | 5 | 6 |
|---|---|---|---|---|---|---|---|
| Mole ratio of ethylene glycol to dibutyl zinc | 0 | 0.6:1 | 1.05:1 | 1.3:1 | 1.5:1 | 2:1 | 3:1 |
| Percent conversion | 1.3 | 34.4 | 59.9 | 59.0 | 54.5 | 53.5 | 29.4 |
| Reduced viscosity | | 8.9 | 7.1 | | | | |

The solid white colored polymers obtained were insoluble in water and at room temperature insoluble in methanol, ethanol, diethyl ether, dioxane, acetone, methyl ethyl ketone, ethyl acetate, tetrahydrofuran, chloroform, methylene chloride, carbon disulfide, benzene, toluene, and the like.

In order to conclusively show the significantly improved polymerization rates of monoepoxides to polymers utilizing the glycols of this invention, Example 1 was repeated with the exception that n-butyl alcohol was used in lieu of ethylene glycol and also the reaction tubes were heated for 24 hours. Percent conversions of monomer to polymer, which are a measure of the rate of polymerization, are indicated in Table 1.

TABLE 1

| | Control 2 | Control 3 | Control 4 |
|---|---|---|---|
| Mole ratio of n-Butyl alcohol to dibutyl zinc | 1.25:1 | 1.5:1 | 1.75:1 |
| Percent conversion | 27 | 38.9 | 39.1 |

EXAMPLE 2

To each of two glass tubes, flushed out with nitrogen gas, there was charged 10 grams of 1,2-epoxyethane, various amounts of poly(ethylene glycol) having an average molecular weight of about 150, 0.15 gram of diethyl zinc and 13 ml. of toluene. The tubes were sealed under a nitrogen gas atmosphere and heated for 10 hours at 90° C. Each tube was then broken open and its crude product washed into a weighed evaporating dish. The dish, containing the crude product, was heated in a steam bath for seven hours and then heated for 16 hours at a temperature of 42° C. under a pressure of 20 mm. Hg. A white colored polymer was obtained in each instance. The mole ratio of poly(ethylene glycol) to diethyl zinc, percent conversion of monomer to polymer and the reduced viscosity of the polymer are tabulated below.

| | 7 | 8 |
|---|---|---|
| Mole ratio of poly(ethylene glycol) to diethyl zinc | 1:1 | 1.5:1 |
| Percent conversion | 50.2 | 61.3 |
| Reduced viscosity | 6.3 | 5.2 |

EXAMPLE 3

The procedure of Example 2 was repeated with the exception that the organometallic was admixed with the glycol and the monoepoxide then added thereto. Also, the reactants used were allyl glycidyl ether, diphenyl zinc and poly(1,2-propylene glycol) having an average molecular weight of about 400. A white colored polymer was recovered in a manner as described in Example 1.

| | 9 | 10 |
|---|---|---|
| Mole ratio of poly(propyleneglycol) to diphenyl zinc | 1:1 | 1.5:1 |
| Percent conversion | 43.1 | 51.7 |
| Reduced viscosity | 5.7 | 3.9 |

What is claimed is:

1. Method for the production of a polymer of an epoxide compound which comprises polymerizing a monomeric oxirane monoepoxide which is free of ester, acid, amino and aldehyde groups, in the presence of the reaction product of a mixture consisting of at least about 0.01 percent by weight, based on the weight of said oxirane monoepoxide, of an organometallic compound having the formula:

$$R_1—Me—R_2$$

wherein $R_1$ and $R_2$ are hydrocarbon radicals containing a maximum of 18 carbon atoms and Me is a metal of Group II of the Periodic Table and from about 0.3 to about 4 moles, per mole of said organometallic compound, of a polyoxyalkylene glycol having the formula:

$$HO(C_nH_{2n}O)_xH$$

wherein $n$ is an integer having a value of 2 to 50, inclusive, and $x$ is an integer having a value of 2 to 25, inclusive.

2. Method as defined in claim 1 wherein the said glycol is used in an amount of from about 0.5 to about 3 moles, per mole of said organometallic compound.

3. Method as defined in claim 1 wherein said monomeric oxirane monoepoxide is a member selected from the group consisting of epihalohydrins, olefin oxides, and epoxy alkyl ethers having the formula:

$$CH_2—CH—R—O—R'$$
$$\diagdown \! O \! \diagup$$

wherein $R'$ is a hydrocarbon radical and $R$ is a saturated, aliphatic hydrocarbon radical.

4. Method as defined in claim 1 wherein the said glycol is poly(ethylene glycol).

5. Method as defined in claim 1 wherein the said glycol is poly(propylene glycol).

6. Method as defined in claim 1 wherein the said organometallic compound is dibutyl zinc.

7. Method as defined in claim 1 wherein the said organometallic compound is diethyl zinc.

8. Method as defined in claim 1 wherein the said organometallic compound is diphenyl zinc.

9. Method as defined in claim 1 wherein the said oxirane monoepoxide is 1,2-epoxy-3-phenoxy-propane.

10. Method as defined in claim 1 wherein the said oxirane monoepoxide is 1,2-epoxyethane.

11. Method as defined in claim 1 wherein the said oxirane monoepoxide is 1,2-epoxypropane.

12. Method for the production of a polymer of an epoxide compound which comprises contacting an oxirane monoepoxide which is free of ester, acid, amino and aldehyde groups with a polymerization catalyst consisting of at least about 0.01 percent by weight of an organometallic compound having the formula:

$$R_1\text{—Me—}R_2$$

wherein $R_1$ and $R_2$ are hydrocarbon radicals containing a maximum of 18 carbon atoms and Me is a metal of Group II of the Periodic Table and from about 0.5 mole to about 3 moles, per mole of said organometallic compound, of a polyoxyalkylene glycol having the formula:

$$HO\text{(}C_nH_{2n}O\text{)}_xH$$

wherein $n$ is an integer having a value of 2 to 50, inclusive, and $x$ is an integer having a value of 2 to 25, inclusive, whereby said oxirane monoepoxide which is free of ester, acid, amino and aldehyde groups, polymerizes to form a polymer.

13. Method as defined in claim 1 wherein the said oxirane monoepoxide is allyl glycidyl ether.

14. The reaction product of a mixture consisting of an organometallic compound having the formula:

$$R_1\text{—Me—}R_2$$

wherein $R_1$ and $R_2$ are hydrocarbon radicals containing a maximum of 18 carbon atoms and Me is a metal of Group II of the Periodic Table and from about 0.3 to about 4 moles, per mole of said organometallic compound, of a polyoxyalkylene glycol having the formula:

$$HO\text{(}C_nH_{2n}O\text{)}_xH$$

wherein $n$ is an integer having a value of 2 to 50, inclusive, and $x$ is an integer having a value of 2 to 25, inclusive.

15. The reaction product of a mixture consisting of an organometallic compound having the formula:

$$R_1\text{—Me—}R_2$$

wherein $R_1$ and $R_2$ are hydrocarbon radicals having from 1 to 10 carbon atoms and being free of olefinic and acetylenic unsaturation and Me is a metal of Group II of the Periodic Table and from about 0.5 to about 3 moles, per mole of said organometallic compound, of a polyoxyalkylene glycol having the formula:

$$HO\text{(}C_nH_{2n}O\text{)}_xH$$

wherein $n$ is an integer having a value of 2 to 5, inclusive, and $x$ is an integer having a value of 2 to 5, inclusive.

16. A reaction product as defined in claim 14 wherein the said glycol is poly(ethylene glycol).

17. A reaction product as defined in claim 14 wherein the said glycol is poly(1,2-propylene glycol).

18. A reaction product as defined in claim 14 wherein the said organometallic compound is diethyl zinc.

19. A reaction product as defined in claim 14 wherein the said organometallic compound is dibutyl zinc.

20. A reaction product as defined in claim 14 wherein the organometallic compound is diphenyl zinc.

21. A rection product as defined in claim 14 wherein $R_1$ and $R_2$ are alkyl containing a maximum of 18 carbon atoms.

References Cited

UNITED STATES PATENTS

| 2,870,099 | 1/1959 | Borrows et al. | 260—2 |
| 3,100,750 | 8/1963 | Bailey et al. | 260—2 |
| 2,870,100 | 1/1959 | Stewart et al. | 260—2 |
| 3,135,705 | 6/1964 | Vandenberg | 260—2 |

FOREIGN PATENTS

| 870,418 | 6/1961 | Great Britain. |

OTHER REFERENCES

Advances In Chemistry Series (ACS), 23-Metal Organic Compounds (pp. 164—165 relied on), 1959; Symposium 4–1957.

WILLIAM H. SHORT, *Primary Examiner.*

T. PERTILLA, *Assistant Examiner.*

U.S. Cl. X.R.

252—431; 260—88.3, 47